J. W. Routh.

Tea and Coffee Pot Stand.

Nº 87,114. Patented Feb. 23, 1869.

Witnesses.
Harry King
Leopold Owert

Inventor.
James W. Routh.
per Alexander F. Mason

United States Patent Office.

JAMES W. ROUTH, OF DECATUR, ILLINOIS, ASSIGNOR TO HIMSELF, JOHN A. AIKMAN, AND WALKER H. TISDALE, OF THE SAME PLACE.

Letters Patent No. 87,114, dated February 23, 1869.

IMPROVED TEA AND COFFEE-POT STAND.

The Schedule referred to in these Letters Patent and making part of the same.

*To all whom it may concern:*

Be it known that I, JAMES W. ROUTH, of Decatur, in the county of Macon, and in the State of Illinois, have invented certain new and useful Improvements in "Tea and Coffee-Pot Stand;" and do hereby declare that the following is a full, clear, and exact description thereof, reference being had to the accompanying drawings, and to the letters of reference marked thereon.

The nature of my invention consists in so constructing a tea or coffee-pot stand, providing it with a false bottom, that the pot can be easily tilted to pour out its contents.

In order to enable others skilled in the art to which my invention appertains, to make and use the same, I will now proceed to describe its construction and operation, referring to the annexed drawings, which form a part of this specification, and in which both figures represent stands, with the false bottom tilting to different sides.

A represents a stand for a tea or coffee-pot, which stand is provided with a false bottom, B, hinged to the same.

This bottom is, on one side, provided with a semi-circular flange, C, either on the side where it is hinged, or on the side opposite.

Figure 1:
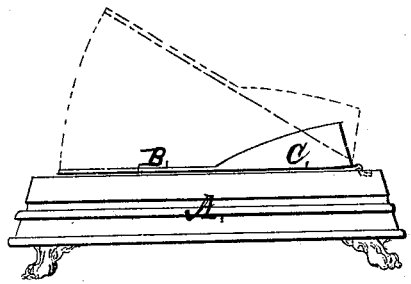
Figure 2:
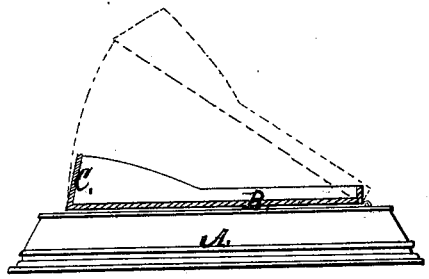

The false bottom may be either flat, as shown in Figure 1, or provided with a small flange, as shown in Figure 2. By this means the tea-pot or coffee-pot can easily be tilted, to be poured out, without any danger of spilling.

Having thus fully described my invention,

What I claim as new, and desire to secure by Letters Patent, is—

Providing a tea or coffee-pot stand with a hinged or pivoted false bottom, substantially as and for the purposes herein set forth.

In testimony that I claim the foregoing, I have hereunto set my hand, this 18th day of September, 1868.

JAMES W. ROUTH.

Witnesses:
M. F. KANAN,
J. A. AIKMAN.